United States Patent [19]

Simon

[11] Patent Number: 5,255,811

[45] Date of Patent: Oct. 26, 1993

[54] CLOSURE FOR A FISH TANK

[75] Inventor: Allen Simon, East Northport, N.Y.

[73] Assignee: Four Paws Products, Ltd., Hauppauge, N.Y.

[21] Appl. No.: 950,019

[22] Filed: Sep. 24, 1992

[51] Int. Cl.⁵ ............................................. B65D 55/14
[52] U.S. Cl. .................................. 119/265; 220/323; 220/210; 70/168
[58] Field of Search ............... 220/210, 323; 119/5; 70/134, 163, 167, 168, 169; 292/DIG. 51

[56] References Cited

U.S. PATENT DOCUMENTS

| | | | |
|---|---|---|---|
| 2,038,737 | 4/1936 | Jambrich | 292/DIG. 51 X |
| 4,505,140 | 3/1985 | Solow | 70/18 X |
| 5,000,117 | 3/1991 | Gordon | 119/5 |
| 5,005,522 | 4/1991 | Gordon | 119/5 |
| 5,009,190 | 4/1991 | Gordon | 119/5 |
| 5,138,976 | 8/1992 | Gordon | 220/323 X |

Primary Examiner—Allan N. Shoap
Assistant Examiner—Paul A. Schwarz
Attorney, Agent, or Firm—Darby & Darby

[57] ABSTRACT

In accordance with the invention, a fish tank is provided with an internally extending flange that circumscribes the top opening of the tank. A cover, having a screened opening, rests on the top of the tank and includes on its undersurface a locking mechanism which, by rotation of a removable key, engages the flange and prevents removal of the cover.

11 Claims, 3 Drawing Sheets

CLOSURE FOR A FISH TANK

BACKGROUND OF THE INVENTION

This invention relates generally to fish tanks as might be used in the home by hobbyists or in the office for purposes of decoration, and more particularly to a closure for a fish tank in order to limit access to the tank and its inhabitants. Fish tanks, as constructed and used by hobbyists and decorators, frequency have open tops which leave the inhabitants and other contents of the tank subject to unfriendly actions by cats, playful kids, and even kleptomaniacs. Fish tanks in public places can become repositories for scraps of paper, cigarette butts, and the like. People also tend to feed fish, in tanks owned by others, with almost any available food scraps.

In aquariums and in many other places of business, for example, in office reception areas and in waiting areas of restaurants, fish tanks are "built in", that is, access by the public to the contents of the fish tanks is prevented by installing the tank flush with a wall so that only one side face of the tank is visible to a viewer. Servicing the tank and feeding the inhabitants thereof are accomplished behind the wall by authorized personnel, who have ready access to the tank.

However, where a built-in installation for the fish tank is not used, in the home and for less permanent public displays that do not warrant permanent installation and enclosure, protecting the top side of a fish tank remains a problem.

What is needed is a simple closure for the top of an unenclosed fish tank that limits access to unauthorized parties but provides ready access to authorized persons and, if desired, allows for feeding and ventilating the interior of the tank without removal of the closure.

SUMMARY OF THE INVENTION

Accordingly, it is an object of this invention to provide an improved closure for a fish tank.

A further object of the invention is to provide an improved closure for a fish tank that allows direct access to the tank interior only to authorized persons.

Yet another object of the invention is to provide an improved closure for a fish tank which can be adapted for use with conventional tanks.

In accordance with the invention, a fish tank is provided with an internally extending flange that circumscribes the top opening of the tank. A cover, having a screened opening, rests on the tank and includes on its undersurface a locking mechanism which, by rotation of a removable key, engages the flange and prevents removal of the cover.

Further objects and advantages of the invention will be apparent from the specifications and drawings. The invention accordingly comprises the features of construction, combination of elements, and arrangement of parts which will be exemplified in the constructions hereinafter set forth and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENT

Figure 1:
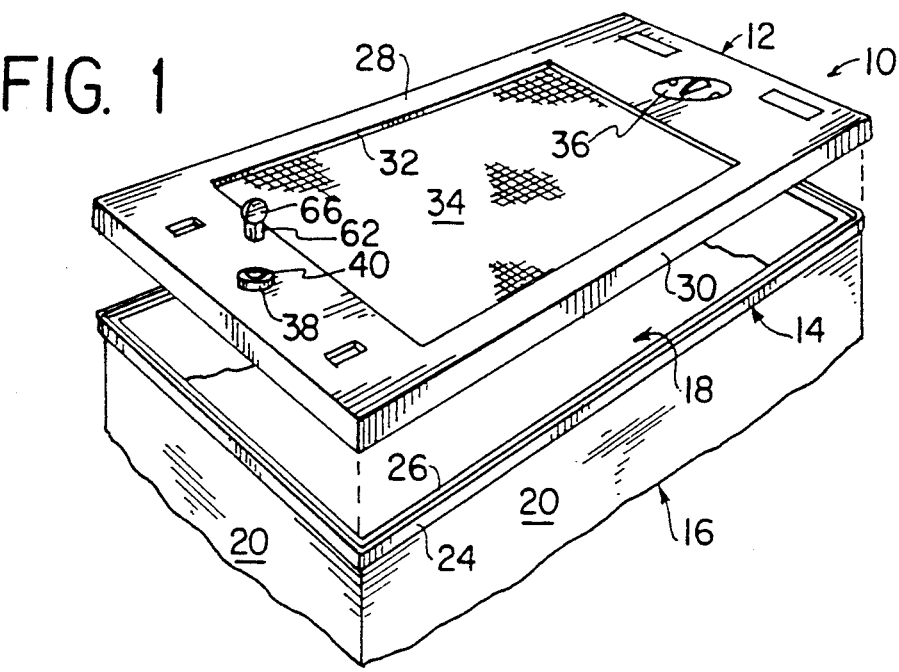
FIG. 1 is a top perspective view of a fish tank closure in accordance with the invention.
Figure 2:
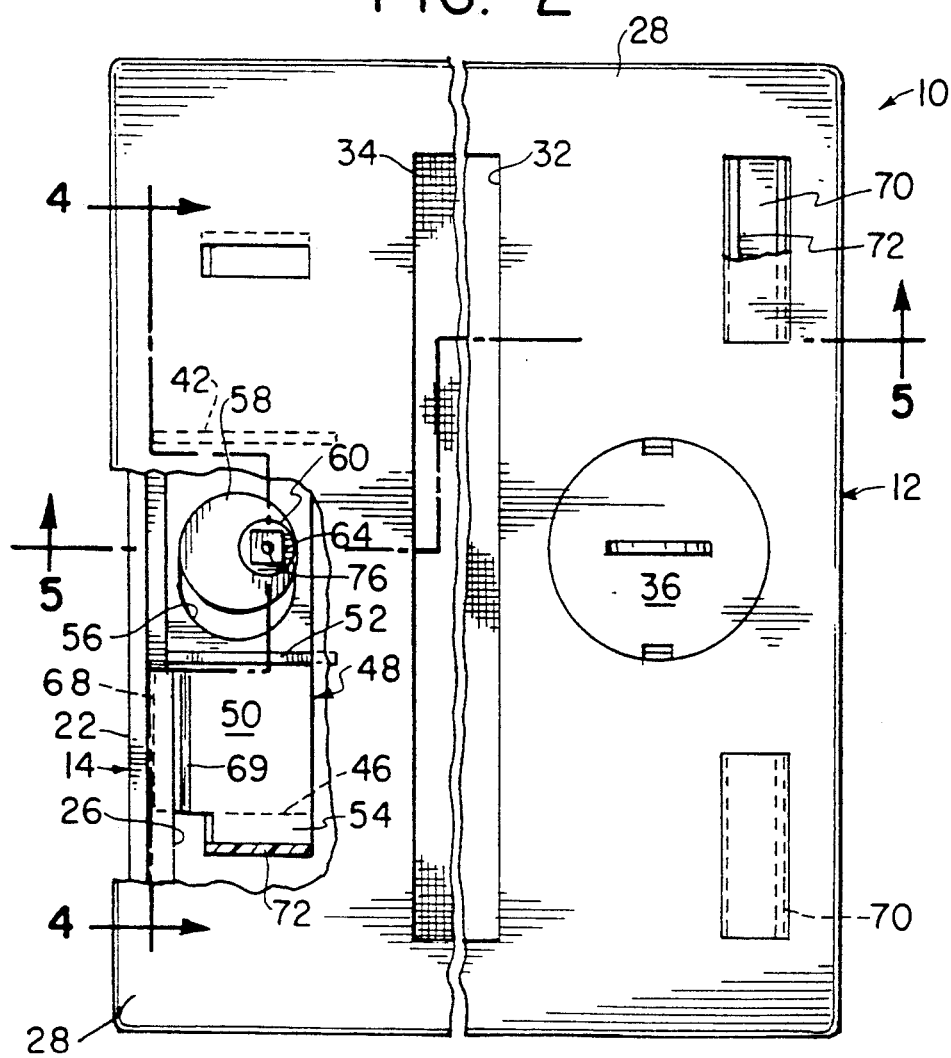
FIG. 2 is a top fragmented view of the fish tank closure of FIG. 1, with portions cut away.
Figure 3:
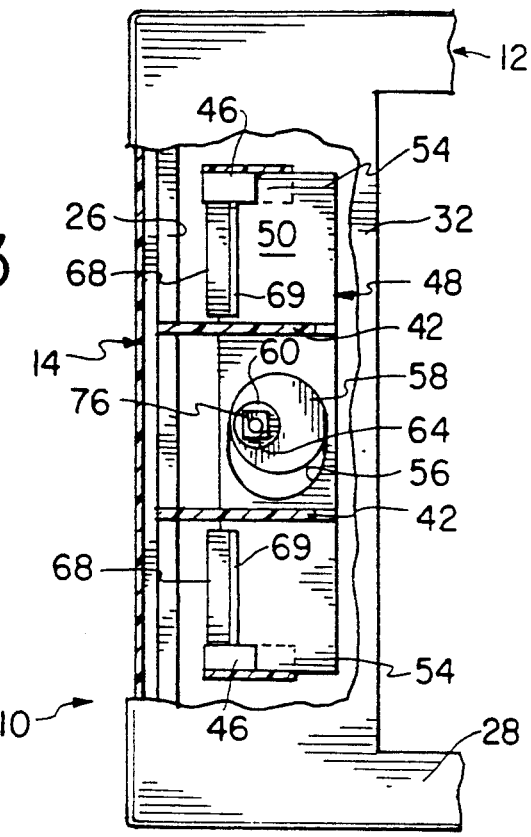
FIG. 3 is a partial view similar to FIG. 2.

With reference to the figures, a closure 10, in accordance with the invention, for a fish tank 16 includes a cover 12 and a frame 14. The tank 16 has a rectangular opening 18 comprising four walls 20, usually made of clear glass. The frame 14 is four-sided to correspond with the dimensions of the rectilinear opening 18 and in cross-section (FIG. 5) includes a U-shaped portion 22 that cradles the top edge of the glass wall 20. On each frame side, an outside extension 24 from the U-shaped portion 22 runs parallel to and adjacent to the glass wall 20 so as to protect and reinforce the upper edge of the glass wall 20. On each frame side, a railing 26 extends from the inside of the U-shaped portion 22 and is generally horizontal, extending inwardly from the glass wall 20 toward the center of the tank. Thus, the frame 14 is a continuous border around the inner periphery of the glass walls 20, as viewed from the top (FIGS. 1-3). The frame 14 may be fabricated of metal or plastic material and is preferably joined to the glass walls 20, for example, by means of an adhesive (not shown).

The cover 12 includes a rectangular face plate 28 and a continuous depending peripheral skirt 30, which is dimensioned to fit over the frame 14 with the skirt 30 generally parallel to and adjacent to the outside extension 24 on the frame 14. In the closed or covered state of the fish tank (FIG. 5), the cover 12 rests upon the U-shaped portion 22 of the frame 14.

A rectangular opening 32 through the face plate 28 of the cover 12 is covered, for example, with a mesh screen 34 so that the tank is ventilated while at the same time direct access to the contents of the tank is inhibited. A door 36 at one side of the mesh screen 34 is openable and/or removable so that food may be delivered into the tank as necessary without detaching the cover 12 from the tank 16.

Figure 4:
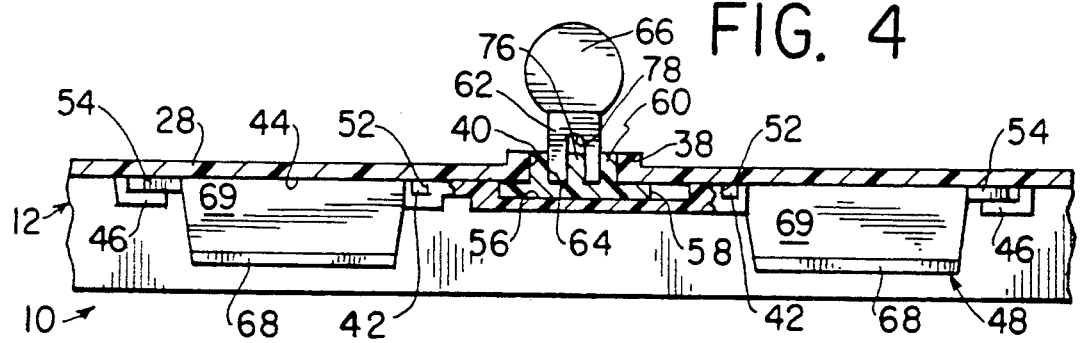
FIG. 4 is a elevational view, in section, taken along the line 4—4 of FIG. 2.

On the other side of the mesh screen 34, away from the door 36, a raised circular boss 38 has a circular opening 40 therethrough. A pair of guide rails 42 (FIG. 4) extend from the inner or under surface 44 of the face plate 28, being positioned on both sides of the opening 40 and oriented perpendicularly to the adjacent wall 20. A pair of horizontal supports 46 extend from the under surface 44 of the face plate 28 in a direction parallel to the rails 42 and spaced further from the circular opening 40 than are the rails 42.

Also extending from the under surface 44 of the cover 12 are latch plates 70, which extend horizontally, that is, are parallel to the face plate 28 when the closure is assembled on a fish tank. Posts 72 connect the cover latch plates 70 to the face plate 28.

A slide 48 has a generally planar upper surface 50, which has a pair of parallel grooves 52, contoured in cross section and spaced apart so as to slidingly receive the guide rails 42 formed on the under surface 44 of the face plate 28.

Wings 54 extending at opposite ends from the slide 48, fit slidingly in the space between the horizontal supports 46 and the under surface 44 of the face plate 28, such that the slide 48 is suspended beneath the face plate 28 with the generally planar surface 50 of the slide 48 in contact with the under surface 44 of the face plate 28, and with the rails 42 engaging the grooves 52. As described more fully hereinafter, the slide can translate parallel to the grooves 52, with vertical constraint provided by the horizontal supports 46 and wings 54.

In addition to the grooves 52, a shallow oval-shaped recess 56 extends into the planar surface 50 of the slide 48. The recess 56 comprises opposite circular ends connected together with short straight segments (FIG. 2). A circular disk 58 fits within the oval recess 56; the disk 58 and the ends of the recess 56 have the same circular diameter.

A circular collar 60, eccentrically mounted relative to the circular center of the disk, extends from a planar surface of the disk 58 and slidingly fits in the opening 40 of the boss 38 on the cover 12.

Latches 68, which are generally parallel to the upper surface 50 of the slide, extend from the under surface of the slide 48 toward the adjacent tank wall 20. Intermediate posts 69 connect the slide latches 68 to the main body of the slide 48.

Triangular reinforcements 74 rigidize the latch plates 70 and latches 68 to give greater strength against deflection. The latches 68 on the slide 48 and the latch plates 70 on the cover extend vertically into the tank 16 to a depth greater than the depth of the railing or inner flange 26 of the frame 14, when the cover 12 rests on the frame 14.

When assembled, the disk 58 rests in the oval recess 56 of the slide 48 with the collar 60 extending through the circular opening 40 in the cover 12 for oscillatory, eccentric, rotation therein. With the slide 48 guided by the rails 42 sliding in the grooves 52 and supported by the wings 54 on the horizontal supports 46, the disk 58 is sandwiched between the under surface 44 of the cover 12 and the slide 48.

A key 62 of square cross section, enters a similarly dimensioned rectangular depression 64 in the collar 60 of the disk 58 such that when the key 62 is gripped by an integral handle 66 and rotated about its axis, the disk 58 rotates about its eccentric axis and causes the slide 48 to translate along the rails 42. The length of the oval recess 56 in the direction transverse to the rails 42 limits rotation of the key through an oscillatory angle in the order of 180°. Thus, the slide is able to move from a first position (FIG. 3) where the latches 68 on the slide 48 are clear of the inner flange 26 of the frame 14, to a second position (FIG. 2) where the latches 68 underlie the inner flange 26 on the frame 14.

Figure 5:
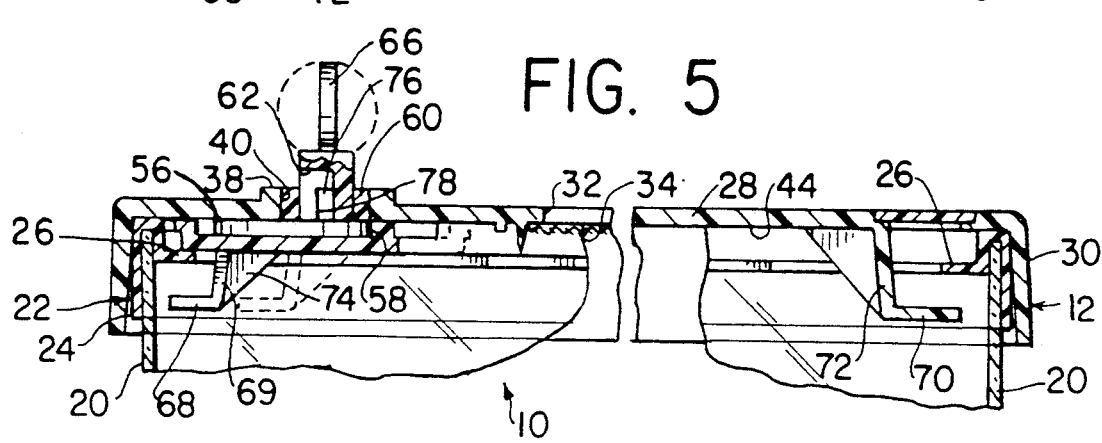
FIG. 5 is an elevational view, in section, taken along the line 5—5 of FIG. 2.
Figure 6:
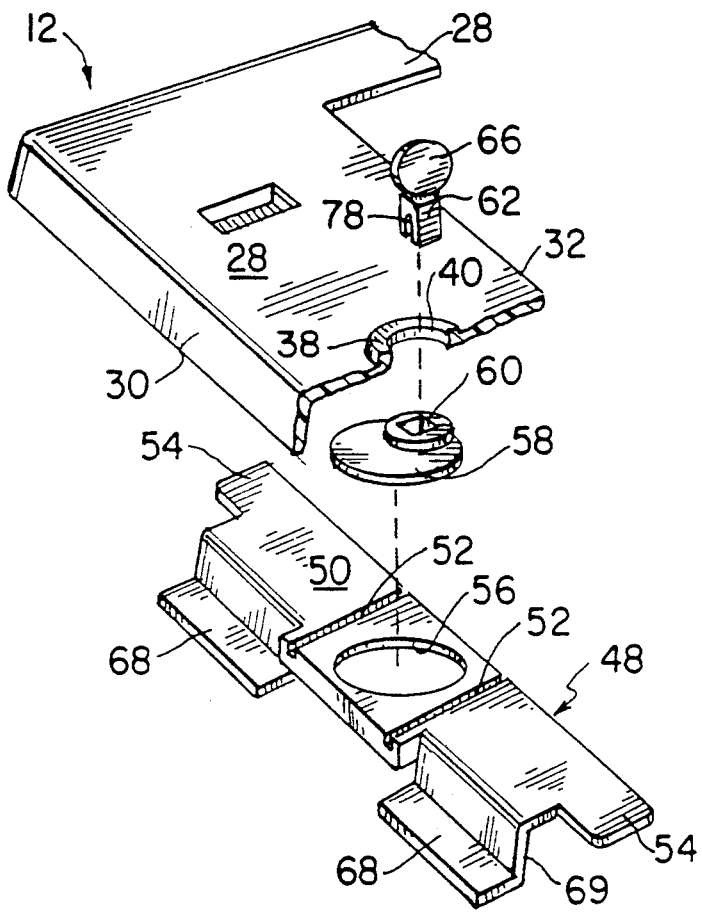
FIG. 6 is an exploded partial view, in perspective of the invention.

Thus, when the slide 48 is in the withdrawn position shown in FIG. 3, and also in FIG. 5 with broken lines, the cover 12 may be placed onto the fish tank 16 by first angling the cover 12 so that the cover latches 70 slip beneath the flange 26 on the frame 14. Then, the other end of the cover 12, where the slide 48 is located, is lowered outside and over the frame 14 to the position shown in FIG. 5. A turn of the key 62 through an arc of 180° moves the slide 48 into the position shown in FIG. 2, and in FIG. 5 in solid lines. In this position, the slide latches 68 are beneath the flange 26 of the frame 14, and it is not possible to raise the cover 12, that is, to remove the cover 12 from the flange 26 (and the fish tank).

The key 62,66 is removable from the depression 64. Thus, a degree of protection is provided for the fish tank and its contents while the cover 12 is locked in place. No one can place his or her hand, or paw, in the tank and only small particles that would pass through the screen 34, can be readily entered into the tank.

Obviously, the construction of the present invention will not prevent any person, who is intent upon gaining access to the contents of the fish tank, from making entry. The screen is easily destroyed and a square-ended object that reasonably fits the depression 64 on the disk 58 will be able to operate the closure mechanism. However, most household pets, small children, and casual mischief-makers will be deterred from tampering with the fish tank by the closure 10 in accordance with the invention. Certainly, more sophisticated locking devices can be incorporated to prevent unauthorized operation of the disk 58, if desired.

In this regard, to further inhibit undesirable operation of the cover mechanisms, a pin 76 extends from the disk 58 concentrically with the collar 60. Thus, only a squared key 62 that has a recess 78 to receive the pin 76 can be used to operate the mechanism, as shown.

The invention is described above in an apparatus where the frame 14 surrounding the fish tank 16 and the tank itself are manufactured for operation with the cover 12 in accordance with the invention. The inner railing or flange 26 on the tank 16 is the element which is necessary for proper latching of the cover 12.

Figure 7A:
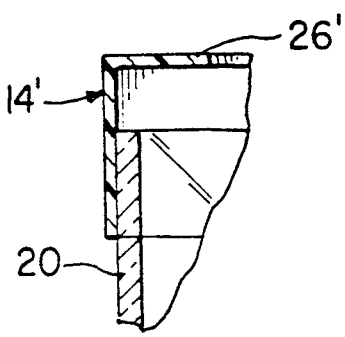
FIG. 7a,b,c are fragmentary sectional views of alternative frame embodiments in accordance with the invention.

In an alternative embodiment in accordance with the invention, a frame 14', as illustrated in FIG. 7a, is joined directly to the outsides of the glass walls 20, with a railing or flange portion 26' turned inwardly. In such a construction, the cover 12 (FIGS. 1,5) may be used, with the same slide mechanism or one substantially the same. The cover 12 will ride slightly higher relative to the glassed in portion of the tank than in FIG. 5. The frame 14' is fixed to the glass walls 20 in a known manner, for example, with an adhesive.

Figure 7B:
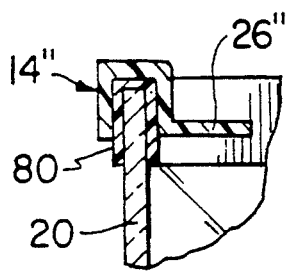

Also, tanks of a conventional nature that have the top edges of the glass protected by a rim 80 of metal or plastic, as illustrated in FIG. 7b, can be adapted to use the cover 12 and its locking mechanism in accordance with the invention by adding a frame 14" having an inner railing or flange 26". The frame 14" is fixed to the rim 80, for example, with an adhesive. Thus, the cover 12, as previously described, may be used with a conventional fish tank.

Figure 7C:
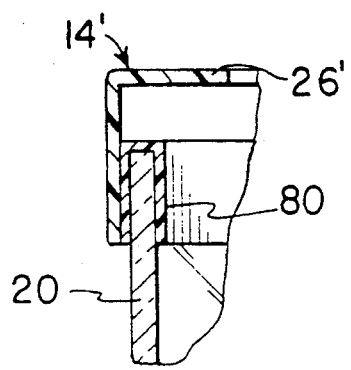

In FIG. 7c, a conventional tank with a rim 80 is adapted for use with the cover 12 by using a flange 14', similar to that in FIG. 7a.

It should be understood that the flanges 26, 26', 26" need only be present at the upper edges of the glass walls 20 at positions corresponding with the latch plates 70 on the cover 12 and the latches 68 on the slide 48. Thus, for example, in an embodiment as represented by FIGS. 7b,c, the frames 14' 14" may only be short lengths., for example, extrusions, that are attached to an existing rim 80 only in those positions in registry with latches and latch plates on the cover 12 and slide 48 to which engagement is to be made. However, a continuous railing or flange 26, adds strength and rigidity to the fish tank, and is desirable.

The invention may also be used with fish tanks of other shapes, for example, round, oval, etc. provided the cover, slide latches, latch plates, etc. are correspondingly contoured.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A closure for a fish tank having vertical walls defining the tank periphery, and a top tank opening, said closure comprising:
   a first flange portion and second flange portion for connecting respectively to the tank walls at opposite ends of said tank and for extending within said periphery;
   a top cover having a top surface, and a bottom surface for resting on said tank and covering at least said top opening;
   a slide mounted for reciprocal sliding motion on said cover bottom surface between an open first position and a closed second position, said slide including a latch spaced from said cover bottom surface, in said first position said first flange portion when connected at one of said tank ends and said latch being clear of each other when said cover rests on said tank and covers said top opening to permit raising of said cover from said tank, in said second position said latch extending beneath said first flange portion to prevent raising of said cover from said one tank end;
   means for unlocking and locking said cover by selectively moving said slide to said first position and to said second position, respectively; said means for unlocking and locking said cover including a cam eccentrically mounted to said cover on an axis and contacting a surface on said slide, said cam being accessible from said cover top surface for rotation about said axis, rotation of said cam moving said slide.

2. A closure for a fish tank as in claim 1, further comprising a latch plate suspended from said cover bottom surface and extending generally oppositely from said latch on said slide, said second flange portion when connected at the other said tank end being between said cover bottom surface and said latch plate to prevent raising the cover from said other tank end, when said slided is in said closed second position.

3. A closure as in claim 1, wherein said surface on said slide that is contacted by said cam to produce reciprocal motion for said slide, is generally oval.

4. A closure for a fish tank as in claim 1, wherein one of said cover bottom surface and said slide includes a guide rail and the other one of said cover bottom surface and said slide includes a groove, said guide rail sliding in said groove when said slide moves between said first and second positions.

5. A closure as in claim 1, wherein said cover is dimensionally similar to said tank periphery, said cover including a dependent skirt at its periphery, said skirt being dimensioned to fit outside said tank periphery.

6. A closure for a fish tank as in claim 1, wherein said flange portions are connected together and extend continuously for correspondence with said tank periphery.

7. A closure as in claim 1, wherein said flange portions are one of below said tank walls when connected to said walls.

8. A closure for a fish tank as in claim 1, wherein said cam is blocked from rotation through a full 360°, said cam being oscillated in moving said slide in a cycle between said first, second, and first positions, consecutively.

9. A tank closure as in claim 8, further comprising an opening in said cover wherethrough said cam is accessible, and a removable key for engaging said eccentric cam through said opening, said cam having a shaped depression with contours corresponding to said key, said cam being pivotable by rotation of said key in said depression to reciprocate said slide between said first and said second positions, whereby free access to the interior of said fish tank is limited to key-holders.

10. A closure as in claim 1, wherein said flange portions are level with said tank walls when connected to said walls.

11. A closure as in claim 1, wherein said flange portions are above upper edges of said tank walls when connected to said walls.

* * * * *